United States Patent [19]
Henry

[11] 3,922,242
[45] Nov. 25, 1975

[54] PYRIDINE INSECTICIDES

[75] Inventor: Arthur Charles Henry, Modesto, Calif.

[73] Assignee: Shell Oil Company, Houston, Tex.

[22] Filed: Jan. 25, 1974

[21] Appl. No.: 436,760

Related U.S. Application Data

[63] Continuation-in-part of Ser. No. 348,549, April 6, 1973, abandoned.

[52] U.S. Cl. ............................. 260/296 R; 424/263
[51] Int. Cl.² .................................. C07D 213/36
[58] Field of Search ............................... 260/296 R

[56] References Cited
OTHER PUBLICATIONS

Feuer et al., J. Am. Chem. Soc. Vol. 91, pp. 1856 to 1857 (1969).

Feuer et al., J. Org. Chem. Vol. 37, pp. 3662 to 3670 (1972).

Lawrence, PhD Thesis, Purdue University (1970), 185 pp.

*Primary Examiner*—John D. Randolph

[57] ABSTRACT

Pyridine resonance hybrids in which the nitrogen atom is substituted and a nitro moiety is bonded via a carbon atom to a carbon atom in the 2-position of the ring, and their use for controlling insects.

5 Claims, No Drawings

PYRIDINE INSECTICIDES

CROSS-REFERENCE TO RELATED APPLICATIONS

This is a continuation-in-part of application Ser. No. 348,549, filed Apr. 6, 1973, now abandoned.

FIELD OF THE INVENTION

This invention relates to novel pyridine resonance hybrids in which the nitrogen atom is substituted and a nitro moiety is bonded via a carbon atom to a carbon atom in the 2-position of the ring, and to their use for controlling insects.

SUMMARY OF THE INVENTION

It has been found that pyridines substituted on the nitrogen atom of the ring and also substituted on the carbon atom of the ring adjacent thereto by a carbon atom bonded to a nitro moiety exist as resonance hybrids which exhibit insecticidal activity.

Spectral analyses have indicated that an N-substituted pyridine also substituted at the 2-position by a carbon atom bonded to a nitro moiety exists as a resonance hybrid, two forms which contribute thereto being represented by the formulae:

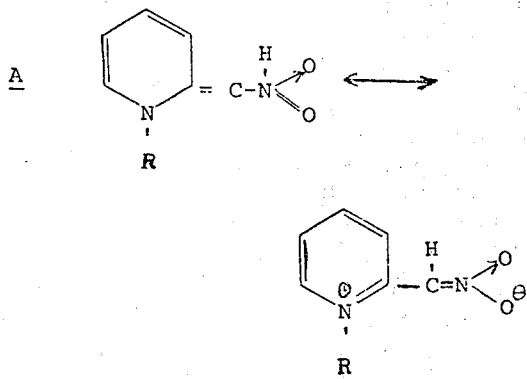

wherein R is a substituent. Form A can be designated an N-substituted-2-(nitromethylene)-1,2-dihydropyridine. Form B can be designated an inner salt of an N-substituted aci-nitromethylpyridinium hydroxide. In the resonance hybrid, the forms can exist as cis or trans isomers, depending upon the spatial relationship of the moieties about the bond between the ring carbon atom and the carbon atom bonded to the nitro moiety. The relative contribution of the resonance forms to the hybrid will vary, depending upon the particular substituents involved, particularly the substituent on the hetero-nitrogen atom (i.e., the moiety, R), whether the compound is in the solid state or is in solution and in the latter case, whether the solvent is water or a hydroxlic solvent, on the one hand, or a non-hydroxylic solvent on the other. In most cases, the hybrid exhibits salt-like character.

Accordingly, and in the interest of brevity, in this specification particular species will be named in terms of resonance form B.

PREFERRED EMBODIMENTS OF THE INVENTION

It has been found that certain of these hybrids exhibit insecticidal activity. These active members — the novel insect control agents of this invention — are resonance hybrids, the two principal forms which contribute thereto being represented by the respective formulae:

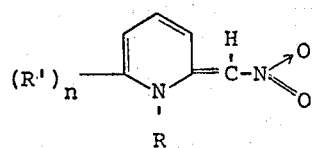

(A)

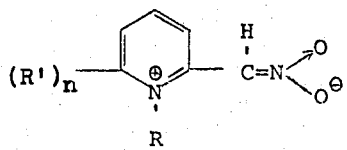

(B)

wherein

R is straight-chain alkyl of from one to six carbon atoms, preferably one to three carbon atoms; —$CD_3$; isobutyl; alkenyl of two or three carbon atoms, preferably vinyl; alkoxyalkyl of two or three carbon atoms, preferably methoxymethyl; cycloalkylmethyl of from four to seven carbon atoms, preferably cyclopropylmethyl; benzyl, benzyl substituted at the 3- and/or 4-positions by alkyl of from one to four carbon atoms, preferably methyl; or halogen (Cl,F,Br,I), preferably chloro; or nitro;

n is 0 or 1;

R' is alkyl of from one to four carbon atoms, preferably methyl.

This invention embraces all of the isomers of these resonance hybrids as well as mixtures thereof.

Typical species of this class of resonance hybrids, their preparation and insecticidal properties, are described in the examples set forth hereinafter.

Two general routes are available for preparing compounds of this invention. In both, 2-pyridone (sold commercially as 2-hydroxypyridine) or the appropriately 6-substituted pyridone, is substituted on nitrogen by treatment with sodium hydride and the appropriate R-bromide, chloride, iodide, sulfate, or toxylate. At least some of the 6-substituted pyridones are known compounds. If necessary, the 6-substituted pyridone can be prepared from the corresponding 2-aminopyridine by known methods, such as diazotization and hydrolysis, followed by the above procedure.

In both routes, the N-substituted pyridone is treated with a trialkyloxonium fluoroborate ($BF_4OR_3$), or a dialkyl sulfate, to form the corresponding pyridinium fluoroborate or alkyl sulfate salt.

According to one of the routes that has been used, the pyridinium fluoroborate salt is then treated with an alkali metal alkoxide to form a product believed to be the corresponding acetal. This product then is treated with nitromethane to form the desired inner salt. These three steps in the conversion of the pyridone can be conducted in a manner analogous to the conduct of the corresponding steps for the conversion of 2-pyrrolidones to the corresponding 2-nitromethylenepyrrolidines in British Pat. No. 1,236,842.

In the second route that has been used to prepare compounds of this invention, the pyridinium fluoroborate salt is treated with an alkali metal salt of nitromethane to form the desired inner salt directly. This reaction preferably is conducted using potassium as the metal and tertiary-butyl alcohol as solvent.

These procedures for preparing salts of this invention are illustrated and exemplified in the following examples of the preparation of particular species of these salts. In all cases, the identity of the product was confirmed by elemental and spectral analyses.

EXAMPLE 1

1-methyl-2-(aci-nitromethyl)pyridinium hydroxide inner salt (I) — First route 65 grams (0.60 mole) of N-methyl-2-pyridone (commercial) was added over a 10-minute period to 116 grams (0.61 mole) of triethyloxonium fluoroborate, with stirring, at ambient temperature. The mixture was stirred for an additional hour, the by-product diethyl ether was decanted, and the residue was washed with ether and stripped of solvent in a rotary evaporator to give 131 grams of crude 2-ethoxy-1-methylpyridinium fluoroborate as a viscous liquid. In another flask, 91 grams (1.5 moles) of nitromethane was added, over a 50-minute period, to 82 grams (1.2 moles) of sodium ethoxide in 500 milliliters of ethanol held at −10° to −20°C; the mixture then was stirred for an additional 20 minutes at −20° to −30°C to give a suspension of $NaCH_2NO_2$. The crude fluoroborate salt dissolved in 100 milliliters of methylene chloride was added dropwise over a 1-hour period to the stirred suspension of $NaCH_2NO_2$ held at −20° to −10°C. The resulting mixture was stirred for an hour while the temperature was allowed to rise to room temperature, then was stirred at room temperature for an additional 3 days. The mixture was stripped of solvents in a rotary evaporator and the residue was triturated with pentane and ether and recrystallized from methylene chloride/tetrahydrofuran mixture to yield 2.7 grams of (I) as a gold solid, melting point: 202° with decomposition. 1.5 grams of additional product was obtained on concentrating the mother liquor.

EXAMPLE 2

1-methyl-2-(aci-nitromethyl)pyridinium hydroxide inner salt (I) — Second route 39.4 grams (0.21 mole) of triethyloxonium fluoroborate was treated with 22.2 grams (0.20 mole) of N-methyl-2-pyridone (commercial) as in Example 1 to give 46.1 grams of crude 2-ethoxy-1-methylpyridinium fluoroborate, which then was dissolved in 50 milliliters of methylene chloride. The resulting solution was added dropwise over a 30-minute period to a solution of 24.5 grams (0.36 mole) of sodium ethoxide in 200 milliliters of ethanol, the mixture being maintained at ice-bath temperature. Then, 61 grams (1 mole) of nitromethane was added to the reaction mixture over a 10-minute period, the mixture being stirred and held at ice-bath temperature. The ice bath then was removed, the mixture was stirred for an additional 25 hours and filtered, and the filtrate was stripped of solvent in a rotary evaporator. The residue was triturated with tetrahydrofuran to leave 10 grams of a yellow insoluble solid which upon recrystallization from methylene chloride/ethyl acetate mixture gave 2.8 grams of (I) as a yellow solid, melting point: 202° with decomposition. 1.8 grams of additional product was obtained on concentrating the mother liquor.

EXAMPLE 3

1-pentyl-2-(aci-nitromethyl)pyridinium hydroxide inner salt (III)

10.4 grams (0.44 mole) of sodium hydride as a 57% dispersion in mineral oil was added in small portions over a 15-minute period to a solution of 28.0 grams (0.40 mole) of 2-pyridone in 300 milliliters of tetrahydrofuran stirred at 20°–25°. 95 grams (0.48 mole) of iodopentane was then added to the mixture all at once and the mixture was allowed to stir at ambient temperature overnight, then at reflux for 55 hours. The reaction mixture was filtered and the filtrate was stripped of solvent in a rotary evaporator. The residue was extracted with methylene chloride and the extract was stripped of solvent. Distillation gave 39.1 grams of N-pentyl-2-pyridone (IIIA) as a yellow liquid, boiling point: 103°C at 0.02 Torr.

33 grams (0.20 mole) of (IIIA) was added rapidly, with stirring, to 39 grams (0.21 mole) of triethyloxonium fluoroborate at ambient temperature. The reaction was exothermic and the by-product diethyl ether refluxed. The mixture then was allowed to stand at room temperature for 1 hour, after which the ether was decanted and the residue was washed with ether. The residue (fluoroborate salt) was dissolved in 50 milliliters of methylene chloride. In a separate vessel, 25 grams (0.41 mole) nitromethane was added over a 5-minute period to a solution of 33 grams (0.29 mole) of potassium tertiary-butoxide in 300 grams of tertiary-butyl alcohol held at 20°–25°C. To this mixture, held at 15°–20°C, the solution of fluoroborate salt was added over a 30-minute period. The mixture then was stirred for 20 hours at ambient temperature. Solid product was obtained by filtration, and additional solid product was obtained by diluting the filtrate with pentane. The combined solids were extracted with methylene chloride. The residue obtained by removal of the solvent from the extract was recrystallized from ethyl acetate to give 19 grams of (III) as an orange solid, melting point: 112°–114°.

EXAMPLES 4–28

Other species of the salts of this invention, prepared by one of the general procedures described in Examples 1–3, were prepared and are listed in Table I.

TABLE I

| Example No. | Structural Moieties* R | n | R¹ | Prepared by Method of Example | Description: solids of indicated color and melting point |
|---|---|---|---|---|---|
| 4 | ethyl | 0 | — | 1 | yellow, 165–167° (dec) |
| 5 | n-propyl | 0 | — | 1 or 2 | yellow, 153–155.5° |
| 6 | n-butyl | 0 | — | 2 | yellow, 124.5–126° |
| 7 | methoxymethyl | 0 | — | 3 | yellow-orange, 163° (dec) |
| 8 | allyl | 0 | — | 3 | yellow-orange, 159–160° (dec) |
| 9 | n-hexyl | 0 | — | 3 | yellow-orange, 99–100° |
| 10 | ethyl | 1 | 6-methyl | 3 | yellow, 122.5–124.5° |
| 11 | benzyl | 0 | — | 3 | orange, 209–212° (dec) |

TABLE I-continued

| Example No. | Structural Moieties* R | n | R¹ | Prepared by Method of Example | Description: solids of indicated color and melting point |
| --- | --- | --- | --- | --- | --- |
| 12 | methyl | 1 | 6-methyl | 3 | red, 212–214° (dec) |
| 13 | propyl | 1 | 6-methyl | 3 | red-orange, 171–173° (dec) |
| 14 | vinyl | 0 | — | 3 | orange, 160–161° (dec) |
| 15 | methoxyethyl | 0 | — | 3 | yellow-orange, 145–147° |
| 16 | isobutyl | 0 | — | 3 | yellow-orange 195–197° (dec) |
| 17 | 4-chlorobenzyl | 0 | — | 3 | yellow, 247° (dec) |
| 18 | 4-nitrobenzyl | 0 | — | 3 | yellow, 234° (dec) |
| 19 | — $CD_3$ | 0 | — | 3 | yellow, 210–211° |
| 20 | benzyl | 1 | methyl | 3 | yellow, 219–220° (dec) |
| 21 | 4-methylbenzyl | 0 | — | 3 | yellow, 225–226° (dec) |
| 22 | 3-chlorobenzyl | 0 | — | 3 | orange, 211–212° (dec) |
| 23 | 3,4-dichloro-benzyl | 0 | — | 3 | yellow, 201–202° (dec) |
| 24 | 4-fluorobenzyl | 0 | — | 3 | yellow-orange, 226–227° (dec) |
| 25 | 3-methylbenzyl | 0 | — | 3 | yellow, 190–192° (dec) |
| 26 | 4-bromobenzyl | 0 | — | 3 | yellow-orange, 259° (dec) |
| 27 | cyclopropylmethyl | 0 | — | 3 | orange, 172–173° (dec) |
| 28 | cyclohexylmethyl | 0 | — | 3 | orange, 208–210° (dec) |

*Referring to formulae, page 2.

Compounds of this invention have been found to be insecticidal. The invention includes therefore within its scope insecticidal compositions comprising an adjuvant — that is, a carrier, optionally a surface-active agent — and, as active ingredient, at least one compound of this invention. Likewise the invention includes also a method of combatting insect pests at a locus which comprises applying to the locus an effective amount of at least one compound of the invention.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Materials usually applied in formulating pesticides may be used as carrier.

Suitable solid carriers may be natural and synthetic clays and silicates, for example, natural silicas such as diatomaceous earths; magnesium silicates, for example, talcs; magnesium aluminum silicates, for example, attapulgites and vermiculites; aluminum silicates, for example, kaolinites, montmorillonites and micas; calcium carbonates; calcium sulfate; synthetic hydrated silicon oxides and synthetic calcium or aluminum silicates; elements such as for example, carbon and sulfur, natural and synthetic resins such as, for example, coumarone resins, polyvinyl chloride and styrene polymers and copolymers; solid polychlorophenols; bitumen; waxes such as for example, beeswax, paraffin wax, and chlorinated mineral waxes; and solid fertilizers, for example superphosphates.

Examples of suitable fluid carriers are water, alcohols, such as for example, isopropanol; ketones, such as for example, acetone, methyl ethyl ketone, methyl isobutyl ketone and cyclohexanone; ethers; aromatic hydrocarbons such as benzene, toluene and xylene; petroleum fractions such as kerosene, light mineral oils, chlorinated hydrocarbons such as carbon tetrachloride, perchloroethylene, trichloroethane, including liquefied normally vaporous gaseous compounds. Mixtures of different liquids are often suitable.

The surface-active agent may be an emulsifying agent or a dispersing agent or a wetting agent; it may be non-ionic or ionic. Surface-active agents usually applied in formulating pesticides may be used. Examples of such surface-active agents are the sodium or calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols, for example, p-octylphenol or p-octylcresol with ethylene oxide and/or propylene oxide; sulfates or sulfonates of these condensation products; alkali or alkaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated caster oil, and sodium alkylaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates or aerosols. Encapsulated formulations and controlled release formulations also are contemplated, as are bait formulations. Wettable powders are usually compounded to contain 25, 50 or 75%w of toxicant and usually contain, in addition to solid carrier, 3–10%w of a dispersing agent and, where necessary, up to 10%w of stabilizer(s) and/or other additives such as penetrants or stickers. Dusts are usually formulated as a dust concentrate having a similar composition to that of a wettable powder but without a dispersant and are diluted in the field with further solid carrier to give a composition usually containing ½–10%w of toxicant. Granules may be manufactured by agglomeration or impregnation techniques. Generally, granules will contain ½–25%w toxicant and 0–10%w of additives such as stabilizers, slow release modifiers and binding agents. Emulsifiable concentrates usually contain, in addition to the solvent and, when necessary, co-solvent, 10–50%w/v toxicant, 2–20%w/v emulsifiers and 0–20%w/v of appropriate additives such as stabilizers, penetrants and corrosion inhibitors. Suspension concentrates are compounded so as to obtain a stable, non-sedimenting, flowable product and usually contain 10–75%w toxicant, 0–5%w of dispersing agents, 0.1–10%w of suspending agents, such as protective colloids and thixotropic agents, 0–10%w of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type and may have a thick mayonnaise-like consistency.

The compositions of the invention may also contain other ingredients, for example, other compounds possessing pesticidal, herbicidal or fungicidal properties, or attractants such as pheromones, attractive food ingredients and the like for use in baits and trap formulations.

These compositions are applied in sufficient amount to supply the insecticidally effective dosage of toxicant at the locus to be protected. This dosage is dependent upon many factors including the carrier employed, the method and conditions of application, whether the formulation is present at the locus in the form of a film or as discrete particles, the thickness of film or size of particles, the insect species to be controlled and the like, proper consideration and resolution of these factors to provide the necessary dosage of active material at the locus being within the skill of those versed in the art. In general, however, the effective dosage of compounds of this invention at the locus to be protected — i.e., the dosage to which the insect contacts — is of the order of 0.001% to 0.5% based on the total weight of the formulation, though under some circumstances the effective concentration will be as little as 0.0001% or as much as 2% on the same basis.

The effectiveness, including lethality, of compounds of this invention can be increased by combining them with conventional synergists used with pyrethrin insecticides — e.g., with compounds containing the methylenedioxyphenyl moiety such as piperonyl butoxide, piperonyl cyclonene, n-propyl isome, sesoxane (sesamex) and the like. A brief summary of such synergists is given at pages 215–218, "Insects," U.S.D.A. Yearbook of Agriculture, 1952. The contemplated synergists are described in more detail in U.S. Pat. No. 3,053,729. The amount of synergist to be employed in the mixture can vary considerably. Thus, less than 1% may be sufficient or 10% or even more may be required by weight of the insecticidal mixture. Generally, about 1% by weight of the synergist in the mixture is preferred.

The effectiveness of compounds of this invention for controlling insects is illustrated in the following Examples.

Insecticidal activity was determined by means of appropriate tests which established the $LC_{50}$ dosage (dosage in grams of test compound per 100 milliliters of solvent required in the solution or suspension used as a spray to kill 50% of the test insects) of compounds of the invention with respect to several species of insects. The liquid carrier used to prepare the solution or suspension was composed of 2 parts by volume of acetone, 8 parts by volume of water and 0.05 parts by weight of Atlox, a wetting agent. The results are summarized in Table II.

TABLE II

| Compound of Example No. | $LC_{50}$ dosage | | |
|---|---|---|---|
| | Housefly | Pea Aphid | Corn Earworm |
| 1 and 2 | >0.5 | 0.08 | 0.031 |
| 3 | >0.5 | 0.0022 | 0.2 |
| 4 | 0.117 | 0.0094 | 0.085 |
| 5 | 0.0202 | 0.0029 | 0.066 |
| 6 | 0.58 | 0.0049 | >0.2 |
| 7 | 0.128 | 0.0089 | 0.036 |
| 8 | 0.042 | 0.0049 | 0.11 |
| 9 | >0.5 | 0.0021 | >0.2 |
| 10 | >0.5 | 0.0024 | 0.04 |
| 11 | >0.5 | 0.00073 | 0.2 |
| 12 | 0.56 | 0.0067 | 0.095 |
| 13 | >0.5 | 0.0022 | 0.2 |
| 14 | 0.14 | 0.0069 | 0.017 |
| 15 | >0.5 | 0.0058 | >0.2 |
| 16 | >0.5 | 0.0004 | 0.2 |
| 17 | >0.5 | 0.0003 | 0.07 |
| 18 | >0.5 | 0.09 | 0.0088 |
| 19 | >0.5 | 0.013 | 0.011 |
| 20 | >0.5 | 0.0016 | >0.2 |
| 21 | >0.5 | 0.0023 | >0.2 |
| 22 | >0.5 | 0.0019 | >0.2 |
| 23 | >0.5 | 0.0007 | >0.2 |
| 24 | >0.5 | 0.0006 | >0.2 |
| 25 | >0.5 | 0.003 | >0.2 |
| 26 | >0.5 | 0.0008 | >0.2 |
| 27 | 0.096 | 0.0037 | 0.1 |
| 28 | >0.5 | 0.0132 | >0.2 | the $LC_{50}$ dosage for all compounds with respect to the rice weevil was greater than 0.1 and with respect to the 2-spotted spider mite was greater than 0.2.

The effect of synergists upon the activity of compounds of the invention was determined, the housefly being the test insect. The procedure used was that described in the previous test, except that the flies were sprayed with a 1% solution of synergist (sesamex) at the time they were sprayed with the solution (or suspension) of test compound. Results were reported as the $LC_{50}$ dosage. The results in those compounds that were synergized are summarized in Table III.

TABLE III

| Compound of Example No. | $LC_{50}$ dosage | | Increase in toxicity due to synergist (%) |
|---|---|---|---|
| | Without Synergist | With Synergist | |
| 3 | 0.5 | 0.0087 | 5740 |
| 4 | 0.117 | 0.022 | 532 |
| 5 | 0.0202 | 0.0025 | 808 |
| 6 | 0.58 | 0.0076 | 3630 |
| 7 | 0.128 | 0.016 | 800 |
| 8 | 0.042 | 0.0067 | 627 |
| 9 | 0.5 | 0.074 | 676 |
| 10 | 0.5 | 0.0175 | 2855 |

What is claimed is:

1. A resonance hybrid in which the two significant forms which contribute thereto are represented by the respective formulae:

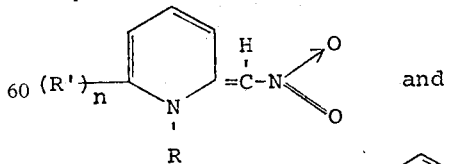
and
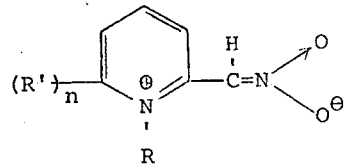

wherein
R is straight-chain alkyl of from one to six carbon atoms; 1-methyl-$d_3$; isobutyl; alkenyl of two or three carbon atoms; alkoxyalkyl of two or three carbon atoms; cycloalkylmethyl of from four to seven carbon atoms; benzyl; benzyl substituted at the 3 and/or 4 positions by one or more of alkyl of one to four carbon atoms; halogen and nitro;
$n$ is zero or 1;
R' is alkyl of from one to four carbon atoms.

2. A resonance hybrid according to claim 1 wherein R is straight-chain alkyl of from one to three carbon atoms; isobutyl; vinyl; methoxymethyl; cyclopropylmethyl; benzyl or benzyl substituted at the 3- and/or 4-positions by methyl, chlorine or nitro; $n$ is zero.

3. A compound according to claim 2 wherein R is isobutyl and $n$ is zero.

4. A compound according to claim 2 wherein R is 4-chlorobenzyl and $n$ is zero.

5. A compound according to claim 2 wherein R is 4-nitrobenzyl and $n$ is zero.

* * * * *